April 8, 1941.  G. C. CUMMINGS  2,237,929
AUTOMATIC BALANCING SYSTEM
Filed July 26, 1939  2 Sheets-Sheet 2

INVENTOR
G. C. CUMMINGS
BY W. F. Simpson
ATTORNEY

Patented Apr. 8, 1941

2,237,929

UNITED STATES PATENT OFFICE 2,237,929

AUTOMATIC BALANCING SYSTEM

George C. Cummings, Orange, N. J., assignor to Bell Telephone Laboratories, Incorporated, New York, N. Y., a corporation of New York Application July 26, 1939, Serial No. 286,505

8 Claims. (Cl. 178—69)

This invention relates to signaling systems and more particularly to an automatic balancing arrangement for telegraph systems for maintaining the balance between the artificial line and the main line of a duplex telegraph system under varying weather conditions.

The systems disclosed in the prior art for reducing or eliminating the effects of varying weather conditions upon the transmission of signaling impulses such as disclosed in U. S. Patents 2,131,870, W. W. Cramer, October 4, 1938, and 2,133,380, R. W. Deardorff, October 18, 1938, usually employed for telegraph transmission are applicable or effective only when the transmission is in one direction at a time over the system, or in accordance with the system shown in U. S. Patent 2,125,704, granted to R. J. Wise, August 2, 1938, the correcting arrangement is effective only during transmission of signals over the system and require the measurement of current flowing over or through at least a portion of the system under at least two different sets of signaling conditions.

An object of this invention is to provide an automatic balancing arrangement for maintaining a refinite relationship between the artificial line and the main line which is operative during only a single set of signaling conditions applied to a full duplex telegraph system.

Another object of this invention is to automatically compensate for changes in the leakage resistance of a full duplex telegraph system under control of the currents flowing in the system during the application of a single set of signaling conditions thereto.

Still another object of this invention is to automatically compensate for changes in the resistance of the line conductors of a full duplex telegraph system under control of currents flowing in the system during only a single set of signaling conditions applied to said system.

It is an object of this invention to provide an improved automatic balancing arrangement which is operative and which reduces or eliminates the effects of varying leakage resistance due to changes in weather conditions during the transmission in either direction and also during transmission in both directions simultaneously.

Another object of this invention is to provide an automatic balancing arrangement which is effective at all times, both during normal transmission and also during idle periods, for maintaining the system in balance and ready to transmit signaling impulses at all times without manually changing any of the adjustments to compensate for weather changes to which the system may be subjected.

Another object of this invention is to provide a resistance network which cooperates with a balance indicating device to enable it to cause the impedance of the artificial line to accurately balance the main line under varying weather conditions.

Another object of the invention is to arrange this network so that it may be readily altered to enable the system to be applied to different telegraph lines without any other changes.

The invention is particularly applicable to interoffice trunks or communication circuits connecting two telegraph central switching stations together, because it will correct and maintain the balance between the artificial lines and the main lines during idle periods when the trunk circuit is not in use and thus maintain the trunk circuit in condition for immediate use at all times without requiring any manual attention or any preliminary transmission period to properly balance the circuit.

The invention may be applied to any of the types of telegraph lines or channels suitable for transmission at so-called low frequency or direct current signaling impulses, such as employed in telegraph systems, including both open wire lines and cable circuits. The invention is also applicable to telegraph channels of composited telephone and telegraph lines as well as to the so-called simplex telegraph channels.

While telegraph lines to which this invention is applicable may include both open wire and cable conductors, the telegraph lines usually encountered are either substantially all open wire lines or substantially all cable conductors, at least between repeater sections. In case the line is substantially all open wire line the variation in leakage resistance produces the greatest effect and thus causes the greatest unbalance between the main line and the artificial line. In case the line comprises substantially all cable very small changes in leakage resistances are encountered. However, the individual cable conductors are usually smaller in size than the open wire lines and thus their resistance is higher. Consequently the change in resistance of these conductors due to temperature changes of the cable becomes considerable. This change in resistance is of sufficient magnitude to require frequent readjustment of the artificial line so that its impedance will be maintained substantially the same as the impedance of the main line.

It has been discovered that in the usual full duplex telegraph system to which potentials of substantially the same magnitude and opposite polarity are applied at each end in accordance with the signals to be transmitted, under certain signaling conditions the leakage resistance or changes in leakage impedance produce very little or no effect upon the line current, but changes in the resistance of the conductor resistance do produce an effect upon the line current, while under other signaling conditions leakage resistance and changes in leakage resistance produce a considerable effect upon the line current, but changes in the resistance of the line conductors produce very little or no effect upon the line current. Thus when the potentials applied to the opposite ends of the line are of opposite polarity the leakage resistance or changes in leakage resistance produce only very small or minor changes or variations in the line current while changes in the resistance of the line conductors produce a substantial effect upon the line current. However, when the potentials applied to both ends of the line are of the same polarity the leakage resistance and changes in leakage produce a substantial change or variation in the current flowing in the main line at this time while changes in the resistance of the line conductors produce little, if any, effect upon the line current at this time.

The effect of the variations of the different resistances under the different signaling conditions pointed out above may be more readily understood by a consideration of the various currents flowing in the system under the different signaling conditions.

When substantially the same potential is connected to both ends of a line or conductor which is not subject to any leakage resistance, no current will flow in the line. This is true for any and all values of the line resistance, that is the total resistance of the line conductors. If the line is subject to leakage resistance then leakage current will flow over the line and through the leakage resistance from the sources of potential connected to both ends of the line. However, under all practical operating conditions of telegraph lines, the leakage resistance is considerably greater than the line resistance; consequently the line resistance and particularly changes in the line resistance under these circumstances produce substantially no appreciable variation in the current flowing in the line. Variations in the leakage resistance of the line, however, produce substantially all of the variation in the line current under these conditions.

Considering now the other condition, where potentials of opposite polarity are connected to opposite ends of a telegraph line or conductor, it should be noted that the potential of the middle of the conductor or at least the electrical center of the line will be at substantially ground potential. Under these circumstances no potential drop would appear across any leakage resistance connected to the line at this point; consequently no leakage current will flow through the line. This would be true for all values of leakages resistance to which practical telegraph lines are subjected. Of course, if the leakage resistance is not exactly in the center of the line a small leakage current will flow through the leakage resistance. However, under all practical conditions encountered in operable telegraph systems, the line current is much greater than the leakage current; consequently the changes in leakage current produce very little, if any, change in the total line current.

However, under these conditions considerable line current is flowing in the line. Consequently, changes in the resistance of the line make an appreciable and substantially all of the change in the line current. If measurements are made during this time they will be largely responsive to the changes in the conductor resistance of the line rather than to changes in the leakage resistance of the line.

By arranging the circuit so that it is effective to measure the unbalance between the main line and the artificial line or the difference in these line currents during the time substantially the same potentials are applied to both ends of the line it is possible to provide automatic compensation for variations in the leakage resistance of the line as encountered on open wire lines.

In case the line conductors are cables, the circuit may be arranged so that it will detect differences in the impedance of the main line and artificial line during the time potentials of opposite polarity are connected to opposite ends of the line. The system will then automatically compensate for changes in the resistance of the line conductors due to temperature changes.

The foregoing objects and features of this invention, the novel features of which are specifically set forth in the claims appended thereto, may be more fully understood when read with reference to the attached drawings, in which:

Figure 1:
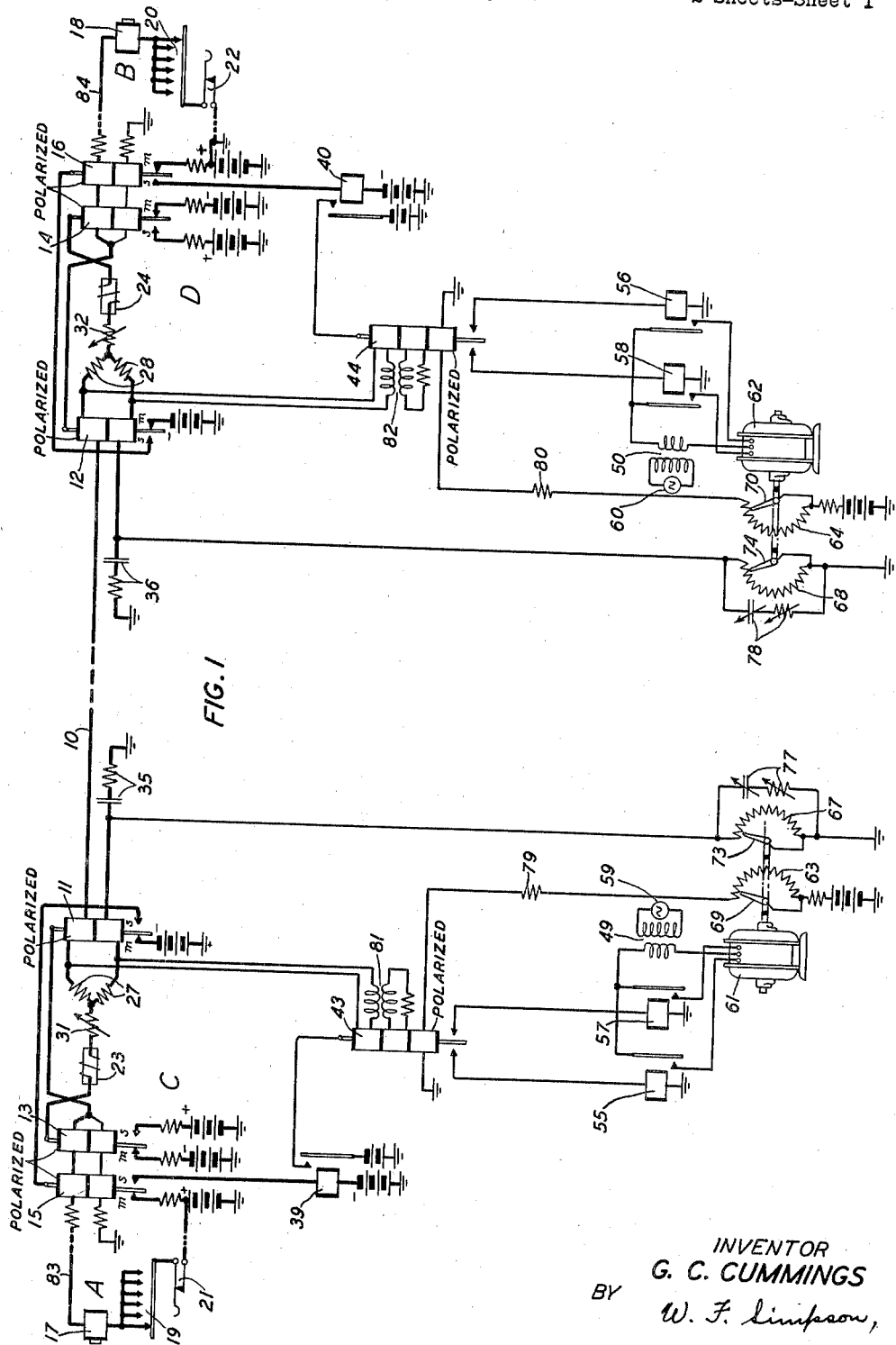
Fig. 1 shows the arrangement applied to a single wire telegraph line.

In accordance with the specific embodiments of the invention described herein, a compensating arrangement is provided at either or both of the ends of the telegraph line or circuit of a full duplex telegraph line, i. e., a telegraph line or system which is capable of simultaneously transmitting impulses in both directions over the line without interference between these two different series of impulses. The compensating arrangement is adapted to be operative and effective for balancing the artificial line associated with the receiving relay at each end during idle periods during which it is assumed that the spacing condition or potential is applied to and transmitted over the system from each end. This is in accordance with the normal manner of operating trunk circuits between telegraph central switching stations. It is to be understood, however, that the apparatus may be arranged so that it will be effective and operative to compensate for changes in impedance of the line when any other set of signaling conditions is applied to the line.

In the specific embodiment of the invention shown in the drawings, the system is arranged to be effective during the time substantially the same potential is applied to both ends of the line. Thus the system, as shown in the drawings, is arranged to compensate for variations in the leakage resistance of the line. However, as pointed out above, the system may be arranged so that it will compensate for variations in the resistance of the line conductors.

Furthermore, the system may be so arranged that the compensation will take place during idle periods irrespective of which type of compensation it is arranged to provide.

In addition, the system is so arranged that corrections will automatically be made for brief intervals during the transmission of the longer signaling impulses. For example, it has been discovered that corrections may be made during the transmission of test signals from an automatic high speed transmitter.

In accordance with a specific embodiment of this invention a difference in current between the currents flowing in the main line and the artificial line is used to control a motor-driven potentiometer which varies the resistance of the artificial line in such a manner, under the given signaling condition, that a definite relationship is maintained between the current flowing in the main line and the current flowing in the artificial line.

It is to be understood that any relationship, ratio, or difference between the currents flowing through the main line and the artificial line may be maintained in any manner similar to the manner described hereinafter.

In the preferred embodiment of this invention, bias means are provided for the device for measuring the difference in the main line and artificial line currents. The bias applied to this device is varied when the resistance of the artificial line is varied in order to secure a better balance under all signaling conditions. A special resistance network is included in the bias circuit so that the bias may be varied simultaneously with the resistance of the artificial line and in any desired manner.

Referring now to the drawings, Fig. 1 represents a simple telegraph system extending between two local subscribers' stations over a full duplex telegraph line or channel 10. Subscriber's station A is provided with a receiving magnet or relay 17 and a transmitting device comprising transmitting contacts 19. A break key 21 is also provided. Subscriber's station B is similarly provided with a receiving relay or device 18, a transmitting device having transmitting contacts 20 and a break key 22. This equipment located at the two subscribers' stations may comprise any suitable telegraph transmitting and receiving apparatus, including teletypewriters and other printing equipment. This equipment may also include other apparatus such as tape-controlled transmitters, perforators, etc., as is well understood in the art. Station A is connected over line 83 to a main central or repeating station C, and station B is similarly connected over line 84 to another main central or repeating station D. The two main stations C and D are connected to each other by means of a telegraph line 10. Station C is provided with receiving relay 11 for receiving telegraph signals from line 10 and repeating them to the subscriber's station A over line 83. Relay 13 is provided for transmitting signals over line 10 which have been received from station A. Break relay 15 is provided to insure that a break signal will be properly transmitted from station A, as is well understood in the prior art. Similar relays 12, 14 and 16 are provided at station D and operate in a similar manner.

At station C resistances 31 and 27 are connected between the transmitting contacts of relay 13 and the windings of the receiving relay 11 to properly control the currents transmitted over line 10 and the artificial line comprising network 25, potentiometer 67 and network 77. It should be noted that both stations A and B may simultaneously transmit messages to the other station without interference; in other words, line 10 and the repeating relays and circuits at the repeater stations C and D operate on a full duplex basis at all times.

The artificial line comprising network 25, potentiometer 67 and network 77 is provided for balancing the impedance characteristics of main line 10 so that the receiving relay 11 is unaffected by the signals transmitted from the sending relay 13. However, in case the leakage resistance of line 10 varies, the impedance of line 10 will also vary and cause the current flowing through the upper winding of relay 11 and the main line to vary in a corresponding manner. This necessitates the changing of the impedance of the artificial line to reestablish a balance between these two impedances if relay 11 is to remain unaffected by the signals transmitted by relay 13. These changes in impedances cause a change in the currents flowing in these line circuits. When the current flowing through these lines thus varies, the potential drop across resistances 27 also varies. The potential drop appearing across resistances 27 is applied to the upper winding of relay 43. Relay 43 is provided with a bias winding and circuit. This relay and bias current is adjusted so that its armature normally stands between the two contacts without making contact with either of them. When the potential applied to the upper winding of relay 43 changes in one direction, relay 43 will close one of its contacts and when the change in potential is in the opposite direction relay 43 will close its other contact. Thus, when a change in the potential difference of sufficient magnitude appears across resistances 27, and thus across the upper winding of relay 43, relay 43 will close one of its contacts. It may be assumed, for example, that it will close its right-hand contact when the potential drop across resistances 27 is in the direction caused by an increase in the current flowing in line 10.

Transformer 81 has one winding connected in series with the upper winding of relay 43 and another winding connected in series with the middle winding of relay 43. This transformer is employed as a filtering element to reduce the effect of stray alternating current and alternating current earth potentials and as a wave shaping device to enable relay 43 to respond more accurately only to changes in direct current potential across resistance 27.

The main telegraph system as shown in Fig. 1 is shown in the marking condition as it would be during the time a connection is established between station A and station B. However, during idle periods the connections of lines 83 and 84 to the circuit at stations C and D, respectively, will be interrupted in case line 10 comprises a trunk line between the main stations C and D. Details of the switching and connecting arrangement between the subscribers' stations A and B have not been shown because they are not essential to the understanding of this invention and are well understood by those skilled in the art. It is to be understood, however, that they may or may not be provided depending upon the type of service furnished between stations A and B.

So long as the line circuit 83 remains closed through the upper windings of the repeater relays 13 and 15 these relays will remain in their left-hand positions as shown on the drawing. Consequently relay 39 will remain released and thus maintain the circuit through the armature of relay 43 interrupted. Similarly during the time relay 11 is maintained in its left-hand position, as shown, it also maintains the circuit of relay 39 interrupted thus preventing this relay from operating and completing a circuit through the armature of relay 43. Relay 11 is maintained in its left-hand position in the arrangement shown in Fig. 1 by the marking potential applied to line 10 at station D due to the fact that line 84 is closed.

During the time that the line 83 and line 84 are both interrupted, a circuit will be completed for the operation of relay 39 from negative battery through the winding of relay 39 and right-hand contacts of relays 15 and 11 to ground through the lower windings of relays 13 and 15. During the time line 83 is interrupted relays 13 and 15 will be in their right-hand positions and during the time line 84 is interrupted relay 11 will be in its right-hand position.

During this time, during which relay 39 is operated, a circuit is completed from battery to the armature of relay 43. If the main line and artificial lines are balanced at this time the armature of relay 43 will remain in its center or neutral position and no further action will take place. However, as soon as the impedance of the artificial lines does not substantially balance the main line the effect of the potential applied to the upper winding of relay 43 will not produce substantially the same effect upon relay 43 as the biasing current flowing through the lower winding of this relay. Consequently relay 43 will be operated and close one or the other of its contacts. One contact will be closed in case the impedance of the artificial line is too low and the other in case the impedance of the artificial line is too high. Assume, for example, that relay 43 closes its right-hand contact, this completes a circuit for the operation of relay 57 from battery through the operated contacts of relay 39, the armature and right-hand contacts of relay 43 to ground through the winding of relay 57. Relay 57 in operating completes an obvious circuit for energizing motor 61 by connecting it to source 59 through transformer 49.

Motor 61 has been shown as an alternating current motor connected to a source of alternating current 59. It is to be understood, however, that any suitable type of reversible motor may be employed as, for example, a direct current motor. Furthermore, any suitable supply or source of current or power may be provided for the operation of the motor.

The operation of motor 61 causes the resistance or potentiometer arms 69 and 73 to be rotated. In the preferred embodiment of this invention the rotor of motor 61 is connected to the shaft of arms 69 and 73 through reduction gears. These gears have not been shown because they operate in the usual and well-understood manner. Arm 73 in rotating varies resistance 67 and thus the impedance of the artificial line connected to lower winding of relay 11. In varying the impedance of potentiometer or resistance 67 the effective impedance and thus the effect of network 77 is also altered so that by proper choice of the constants of this network it together with network 35 and resistance 67 may be made to closely approximate the impedance of line 10 under all usual conditions of line leakage encountered under varying weather conditions.

The resistance or potentiometer arm 69 is insulatively mounted on the same shaft as arm 73 and varies resistance 63 in the biasing circuit of the lower winding of relay 43. This biasing current together with the variable resistance of potentiometer 63 is varied in such a manner that when the necessary correction is made to the artificial line the biasing current of relay 43 will also be so altered that relay 43 will operate to its neutral position and open its right-hand contacts thus releasing relay 57. Relay 57 in releasing interrupts the operating circuit of motor 61 which thereupon ceases to rotate and leaves the impedance of the artificial line connected to the lower winding of relay 11 substantially equal to the impedance of line 10.

The biasing winding and circuit are provided for relay 43 to compensate for the effects of the potential applied to the line at the distant station D. The current flowing over line 10 may be considered composed of two components, one being due to the potential applied to the line at station C by relay 13 and the other due to the potential applied to line 10 at station D by relay 14. In order to maintain the impedance of the artificial line substantially equal to the impedance of the main line it is desirable that the operation of relay 43 be substantially independent of the effects of the potential applied to the line at station D by relay 14. In order to secure this condition the biasing or lower winding is provided for relay 43 and its circuit causes a current to flow through this winding which produces an effect upon the relay which is substantially equal to but opposite to the effect produced by the current flowing in line 10 due to the potential applied to this line at station D.

These two component currents flowing in line 10 are affected differently by the leakage resistance of the line. The leakage resistance of the line tends to cause the current flowing in line 10 at or adjacent to station C due to the potential applied to the line at station C to increase, while the current flowing in line 10 at station C due to the potential applied to the line at station D tends to decrease as the leakage resistance decreases. Consequently, the biasing current or the resistance of the biasing circuit of relay 43 must be varied in a different manner or at a different rate than the resistance of the artificial line. In order to enable both these resistances to be controlled from the same shaft or from the same motor, it is necessary that at least one of these resistances be tapered, that is, the change in resistance due to a given angular rotation of the shaft or motor will vary according to the position of the shaft or of the movable contact of the variable resistance or potentiometer. Furthermore, if the lines to which this balancing arrangement is applied vary widely in their characteristics, it may be necessary to provide different variable resistances or potentiometers which vary at different rates in order to secure the maintenance of a more accurate balance between the artificial line and the main line.

Of course, if the main line is connected to ground at the distant station D at least during the time adjustments are made then this biasing winding is not required because the current flowing in line 10 will be due solely to the potential applied to line 10 at station C and the impedance of the line. The same applies to the current flowing through the artificial line. Consequently when these two currents are equal the artificial line will exactly balance the main line and no potential will be applied to the upper winding of relay 43. Consequently no biasing winding will be required. However, when potentials are applied to both ends of the line during the time adjustments or measurements are made, it is necessary to provide a lower biasing winding to counterbalance the effects of the potential applied to the line at the distant end and it is necessary to vary the biasing current flowing through this winding as the leakage resistance of the line varies so that the current flowing through this biasing winding will at all times substantially neutralize the effects of the current flowing in line 10 due to the potential applied to it at the distant end.

Assume now that the main line current or impedance so vary that relay 43 will close its left-hand contact. This will cause relay 43 to complete a circuit for the operation of relay 55. Relay 55 in operating will complete another circuit through motor 61 which will cause the motor to rotate in the opposite direction and vary the impedance of the artificial line so that it will again balance the main line. It is to be understood that it may not be necessary to provide two windings for motor 61, as the direction of rotation of some suitable motors can be reversed by reversing the polarity of any of its windings with respect to each other or with respect to the source of power or in any other manner.

It was assumed during the operation described above that both lines 83 and 84 were interrupted during the entire time. However, the operation of relays 39, 43, 55 and 57 may be made sufficiently rapid to cause motor 61 to rotate a slight amount during the longer signal impulses and during slight intervals of time during which no signals are transmitted over the system, the only requirement being that the circuits of both lines 83 and 84 be simultaneously opened. Inasmuch as the impedance characteristics of line 10 usually vary very slowly the slight adjustment obtained during the transmission of signal impulses, even when from a high speed automatic transmitter, will be sufficient to maintain the impedance of the artificial line substantially equal to the impedance of the main line 10.

As pointed out above, relay 39 completes a circuit through relays 55 and 57 only during the time that a particular set of signaling conditions is applied to both ends of the system. In the specific embodiment shown in the drawings a circuit through these relays is completed only during the time the spacing impulses are simultaneously transmitted from both ends as when lines 83 and 84 are open. When line 84 is opened a spacing impulse is transmitted by relay 14 to relay 11 thus operating this relay to its right-hand position. Similarly when a spacing impulse is transmitted from station A line 83 is open. During this time relay 15 will be in its right-hand position and thus complete the circuit to relay 39 which in turn completes a circuit through the contacts of relay 43 to either relay 55 or 57. It is to be understood it is within the scope of this invention to arrange the circuit so that the correction or adjustment for variation of leakage resistance may be made equally well during the simultaneous transmission of marking conditions from both ends of the system or so that the correction may be made during the transmission of a marking condition from one end and a spacing condition from the other end of the line 10 so long as the potential applied to both ends of the system is substantially the same.

As shown in Fig. 1 and as described, during the transmission of spacing impulses over line 10 positive battery is connected to both ends of line 10. Thus relay 43 indicates unbalance due to variations in leakage resistance of line 10. It is to be understood that during the transmission of a spacing condition the system may be arranged so that positive battery will be connected to one end of line 10 and negative battery to the other end of line 10 so that the system will correct for changes in the resistance of the conductor of line 10. This correction or adjustment may be made, as pointed out above, during the transmission of simultaneous marking conditions from both ends of the system; during the simultaneous transmission of spacing conditions from both ends of the system; as well as the transmission of a marking condition from one end and a spacing condition from the other end of line 10.

Similar equipment and relays are provided at station D and comprise relays 40, 44, 56 and 58 and motor 62 together with variable resistances or potentiometers 64 and 68. This equipment maintains the impedance of the artificial line comprising network 36, potentiometer 68 and network 78 substantially equal to the impedance of the main line 10.

Figure 2:
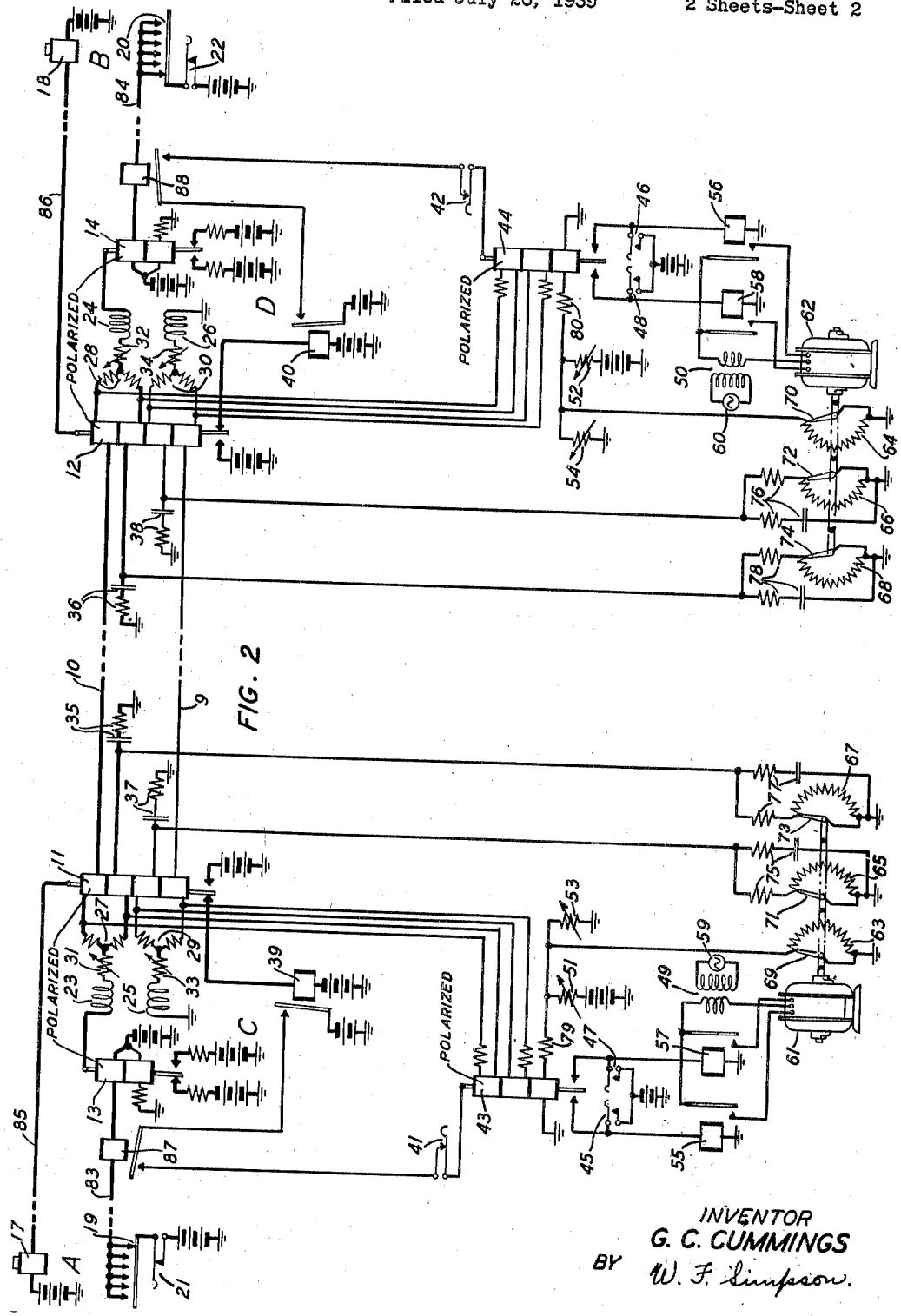
Fig. 2 shows the manner of applying the invention to a two-wire telegraph line such as employed in districts of excessive earth potential and other sources of interfering currents.

Fig. 2 shows the invention applied to a two-wire telegraph system in which an additional wire 9 extends between the main stations C and D. This wire is connected to similar windings of relays 11 and 12 and is connected to ground at each station through resistance networks comprising resistances 33 and 29 and 34 and 30 which are similar to resistances 31 and 27 and 32 and 28, respectively. Small inductances or other suitable networks 23, 24, 25 and 26 are connected in series with resistances 31, 32, 33 and 34 and serve to reduce noise due to high frequency components of telegraph signaling impulses.

An additional artificial line is provided at each of the main stations which cooperates with the auxiliary line 9. These auxiliary artificial lines are provided with a potentiometer controlled by the motor so that this artificial line will also be varied in the same manner as the other artificial line and thus remain balanced with respect to the additional line 9, thus insuring that in addition to maintaining the balance between this artificial line and line 9 it also permits line 9 and the associated windings of relays 11 and 12 to effectively balance out substantially all of the interfering currents due to earth potential and other potentials interfering with the operation of the transmission line.

The operation of the system shown in Fig. 2 is similar to that described in Fig. 1. However, it should be noted that in this case the upper winding of relay 43 is connected across resistances 27 while the middle winding of relay 43 is connected across resistances 29. Thus one winding is connected to the resistances associated with the main line 10 and the other to the resistances associated with the auxiliary line 9. Under these circumstances the filter or waveshaping coils 81 at station C and 82 at station D as shown in Fig. 1 may be dispensed with. In addition, key 41 is provided for disabling the automatic correcting arrangement and keys 45 and 47 are provided for manually altering the impedance of the artificial lines so that the artificial lines may be manually adjusted in case it is desired to dispense with the automatic correcting feature.

The system shown in Fig. 2 is arranged to provide compensation during the time spacing impulses are simultaneously transmitted from both ends of the line as described above with reference to Fig. 1. Thus, in the system shown in Fig. 2 both relays 39 and 87 at station C must be released or in their unoperated position to complete the circuit through the armature of relay 43 to operate the correcting motor 61. Relay 87 is only released during the time line 83 is interrupted either due to the transmission of a spacing impulse from station A or due to some switching equipment not shown. Relay 39 is released only during the time relay 11 is operated to its left-hand or spacing position by the reception of a spacing impulse over line 10 due to the transmission of a spacing signaling condition or impulse from station B or due to the interruption of line 84. Thus the correcting system shown in Fig. 2 is operative only during the transmission of spacing impulses from both ends simultaneously, just as described with reference to Fig. 1. However, it is to be understood that this system also may be arranged to compensate for variations in the leakage resistance of the line and automatically correct the impedance of the artificial line during the simultaneous transmission of a marking condition from both ends of the line or during the transmission of a marking condition from one end and a spacing condition from another end so long as substantially the same potential is applied to both ends of the line during the corrections.

The system is also applicable for compensation for variations in the resistance of the line conductors as well as for compensation of the leakage resistance. As described with respect to Fig. 1 if compensation or adjustment is made during the time the same potential is applied to both ends of the line, the system will automatically compensate for changes in the leakage resistance of line 10. If, however, the compensation or adjustment is made during the time opposite potentials are applied to the opposite ends of the line the system will automatically compensate for variations in the resistance of the conductors of line 10. As pointed out above the same adjustment is applied both to the artificial lines balancing line 10 and to the artificial lines balancing line 9.

In the system shown in Fig. 2, as in the system shown in Fig. 1, it is necessary to provide a biasing winding for relay 43 in order to counteract or neutralize the effects of the current flowing in line 10 due to the potential applied to this line at the distant station. In the system shown in Fig. 2, however, a resistance network comprising resistances 51, 53 and 79 is provided in the biasing circuit in addition to the variable resistance or potentiometer 63, the arm or contact 69 of which is controlled by motor 61. This network is provided to permit variation of the current flowing in the lower biasing winding of relay 43 in the desired manner even though the resistance of variable resistance 63 varies in the same manner as the resistance of the artificial line. In the preferred embodiment of this invention as shown in Fig. 2 all of the variable resistances vary linearly with the angular displacement of their contact arms or the shaft of motor 61. That is, a given angular displacement of the shaft or contact arm any place along the resistance produces the same incremental change of resistance. However, it does not produce the same incremental change in the biasing current flowing through the lower winding of relay 43 due to the fact that the parallel resistance 53 and resistances 51 and 79 tend to limit the maximum current flowing through this winding. Furthermore, since resistance 63 is not a resistance directly in series with the circuit through the lower winding of relay 43, current flowing through this winding is not directly proportional to and does not vary linearly with the value of the resistance of potentiometer 63.

Furthermore, in case the lines to which this invention is applied vary widely in characteristics, it is only necessary to select the proper values of resistances 79, 51 and 53 for each line or type of line to insure that the bias current of relay 43 substantially neutralizes the current in line 10 due to the potential applied thereto at the distant end for all values of leakage resistance usually encountered in telegraph circuits while using the same linear potentiometer or variable resistance 63. When the values of these resistances are properly chosen for each line, then the system will maintain the impedance of the artificial line substantially equal to the impedance of the main line under all operating conditions usually encountered in telegraph systems.

It should also be noted that the telegraph system shown in Fig. 2 is arranged to provide full duplex operation between the stations A and B and that the transmission from station A to station B is entirely separate and independent of the transmission from station B to station A. Furthermore, transmission may be from each station simultaneously, as in the case of full duplex telegraph systems. As in the case of Fig. 1, a telegraph line or channel comprising lines 9 and 10 may include open wire lines or cable pairs and may include any type of composited telegraph line or channel or any combination of these various telegraph transmission channels.

It is to be understood that this invention is not limited to the specific details of the embodiments shown in the drawings and described above but may include, and is applicable to, the various types of telegraph transmission systems known in the prior art. Furthermore, it may be arranged so that it will operate under any set of signaling conditions which it is desirable to apply to the telegraph channel and is effective during the simultaneous transmission over the system in both directions.

What is claimed is:

1. A duplex signal transmitting system comprising a signaling line, transmitting apparatus connected to each end of said line for applying at least two signaling conditions thereto, receiving apparatus connected to each end of said line, an artificial line connected to said receiving apparatus at each end of said line, means for automatically maintaining a definite relationship between the impedance of each of said artificial lines and said signaling line comprising apparatus responsive to changes in the relative impedances of each of said artificial lines and said signaling line, a variable impedance connected in one of said lines, means at one end of said line responsive to a single set of signaling conditions applied to the ends of said line, and means for automatically varying said variable impedance under the joint control of said responsive means and said measuring means for varying said impedance during the application of a single set of signaling conditions to said line.

2. In a duplex telegraph system comprising a metallic telegraph line, transmitting apparatus connected to each end of said line including means for applying signaling conditions to each end of said line and receiving apparatus also connected to each end of said line, an artificial line connected to said receiving apparatus, means for automatically maintaining a definite relationship between the impedance of said artificial lines and said main line comprising apparatus responsive to changes in the relative impedances of said artificial line and said main line, a variable resistance connected to one of said lines and an operative connection between said variable resistance and said responsive device for automatically varying the relative impedance of one of said lines with respect to the other of said lines under control of said responsive device and means for disabling said operative connection under control of the signaling conditions applied to said telegraph line except when a single set of signaling conditions comprising a potential of a specified polarity connected to both ends of said line is applied to said system.

3. In a duplex telegraph system comprising a metallic telegraph line, transmitting apparatus connected to each end of said line including means for applying potential conditions to each end of said line and receiving apparatus also connected to each end of said line, an artificial line connected to said receiving apparatus, means for automatically maintaining a definite relationship between the impedance of said artificial lines and said main line comprising apparatus responsive to changes in the relative impedances of said artificial line and said main line, a variable resistance connected to one of said lines and an operative connection between said variable resistance and said responsive device for automatically varying the relative impedances of said artificial line and said telegraph line under control of said responsive device and means for disabling said operative connection under control of the potential conditions applied to said telegraph line except when a single set of potential conditions comprising potentials of unlike polarity connected to the opposite ends of said telegraph line is applied to said system.

4. A duplex communication system comprising a line, transmitting apparatus connected to each end of said line, means for applying two potential conditions to each end of said line by said transmitting apparatus, receiving apparatus connected to each end of said line, an artificial line connected to each of said receiving apparatus, a device responsive to changes in the relative impedances of one of said artificial lines and said line, means for varying the impedances of one of said lines and apparatus for establishing an operative connection between said responsive device and said impedance varying device when only a given potential condition is applied to both ends of said line by the respective transmitting apparatus.

5. A duplex telegraph system comprising a telegraph line transmitting apparatus connected to each end of said line, means for applying signaling conditions comprising at least two potential conditions to each end of said line by said transmitting apparatus, receiving apparatus connected to each end of said line, an artificial line connected to each of said receiving apparatus, a device responsive to changes in the relative impedances of one of said artificial lines and said telegraph line, means for varying the impedances of one of said lines and apparatus for establishing an operative connection between said responsive device and said impedance varying device when a single set of signaling conditions comprising different potential conditions connected to the opposite ends of said telegraph line by said transmitting apparatus is applied to said system.

6. A duplex communication system comprising a line, transmitting and receiving apparatus connected to said line, an artificial line connected to said receiving apparatus, a variable impedance connected in one of said lines, an indicating device connected to the circuits of said lines, means for applying a bias to said device, apparatus for varying said bias, and an operative connection between said device and variable impedance, and said apparatus for varying bias for simultaneously varying said bias and variable impedance under control of said indicating device.

7. A duplex communication system comprising a line, transmitting and receiving apparatus connected to said line, an artificial line connected to said receiving apparatus, a variable impedance connected in one of said lines, an indicating device connected to the circuits of said lines, means for applying a bias to said device, apparatus for varying said bias, and an operative connection between said device and variable impedance and said apparatus for simultaneously varying said bias and said variable impedance under control of said indicating device, an impedance network connected to said bias means for causing said bias to vary in a different manner than said variable impedance.

8. A duplex telegraph system comprising a first telegraph line, telegraph transmitting and receiving apparatus connected to said line, a first artificial line connected to said receiving apparatus, a second telegraph line connected to fixed sources of potential at each end thereof through said receiving apparatus, an auxiliary artificial line also connected to said receiving apparatus, means for measuring the difference in current flowing through said first line and said first artificial line and the difference in current flowing through said second line and said auxiliary artificial line, an adjustable resistance connected in each of said artificial lines, means for simultaneously varying said adjustable resistances, and means responsive to a single set of signaling conditions applied to said first line for establishing an operative connection between said measuring means and said means for varying said adjustable resistances for controlling said last-mentioned means.

GEORGE C. CUMMINGS.